United States Patent [19]

Weddigen et al.

[11] 4,216,276
[45] Aug. 5, 1980

[54] ELECTROCHEMICAL STORAGE CELL

[75] Inventors: Gert Weddigen, Heidelberg-Neuenheim; Günther Ege, Mannheim; Friedrich Vögtle, Bonn, all of Fed. Rep. of Germany

[73] Assignee: Brown, Boveri & Cie AG, Mannheim-Käfertal, Fed. Rep. of Germany

[21] Appl. No.: 51,207

[22] Filed: Jun. 22, 1979

[30] Foreign Application Priority Data

Jul. 15, 1978 [DE] Fed. Rep. of Germany ....... 2831163

[51] Int. Cl.² .............................................. H01M 4/36
[52] U.S. Cl. .................................... 429/104; 429/191
[58] Field of Search .................... 429/104, 218, 191

[56] References Cited

U.S. PATENT DOCUMENTS

| | | | |
|---|---|---|---|
| 4,012,563 | 3/1977 | Farrington et al. | 429/104 |
| 4,018,969 | 4/1977 | Fischer et al. | 429/104 |
| 4,069,372 | 1/1978 | Voinov | 429/104 |

*Primary Examiner*—Charles F. LeFevour
*Attorney, Agent, or Firm*—Herbert L. Lerner

[57] ABSTRACT

Electrochemical storage cell or battery of the alkali metal and sulfur type operable in the range from about 100° to 200° C. A solvent is added to the alkali sulfides in the cathode chamber to at least partially dissolve the sulfides. In addition to other good properties, the solvent of the invention is outstanding with respect to stability, i.e. can be used for very long periods of time under the conditions of operation without decomposing.

14 Claims, 4 Drawing Figures

ELECTROCHEMICAL STORAGE CELL

CROSS-REFERENCE TO RELATED APPLICATION

U.S. Application Ser. No. 051,206, filed for Gert Weddigen, Bernd Houpert and Monika Gerlach on June 22, 1979 and assigned to Brown, Boveri and Cie Aktiengesellschaft, and assignee of the present invention.

BACKGROUND OF THE INVENTION

1. Field of the Invention

The invention relates to an electrochemical cell and more particularly refers to a new and improved electrochemical storage cell or battery based on alkali metal and sulfur with at least one anode chamber and one cathode chamber which are separated from each other by an ion-conducting solid electrolyte.

2. Description of the Prior Art

U.S. Pat. No. 4,018,969 relates to an electrochemical storage cell or battery, operable in the range of about 100° to 200° C., of the type using an alkali metal as the anolyte and sulfur as the catholyte. The cell has at least one anode chamber and one cathode chamber which are separated from each other by an alkali ion-conducting solid electrolyte. At least one organic aprotic solvent with a boiling point above the operating temperature of the cell is contained in the cathode chamber, for at least partially dissolving the sulfur and/or its alkali compounds.

Normally, the operating temperature of alkali metal-sulfur cells is at about 300° to 350° C. One reason therefor is the fact that at this temperature, the conductivity of the alkali ion-conducting solid electrolyte is substantially higher than at lower temperatures. The second reason is that sulfur or alkali polysulfide is used as the cathodic reaction partner, which must be present in the molten condition. These mostly used sodium polysulfides have melting points between 242° and 1200° C.

At operating temperatures of 300° to 350° C., the discharge reaction can proceed, if sodium is used, to about $Na_2S_3$ (more exactly, according to the phase diagram, to $Na_2S_{2.8}$). This corresponds to a theoretical energy density of 760 Wh/kg. If the cell is discharged further, the reaction products $Na_2S_2$ and $Na_2S$ are generated, which are solid at 300° to 350° C. In the presence of solid reaction products, the kinetics become so poor that the cell can then be charged and discharged no longer or only with a very small power density, so that the possible higher energy densities ($Na_2S$ corresponds to 1260 Wh/kg) cannot be obtained.

Through the presence of a solvent, the reaction can continue to proceed in the direction toward the more alkali-rich sulfides. The high melting point of such alkali-rich sulfides does not matter, since the sulfides are dissolved, at least partially, and the alkali metal is present in ion form, which ensures adequate reaction kinetics. If sodium is used, the discharge reaction can be carried out until the stoichiometry in the cathode chamber is $Na_2S$ instead of only $Na_2S_3$. If one neglects the mass and volume of the added solvent, the theoretical energy density is increased from 760 Wh/kg to 1260 Wh/kg. In addition, lowering the operating temperature to 100° or 200° C. has the advantage of substantially reduced danger of corrosion and permits the use of plastics as the housing part.

According to U.S. Pat. No. 4,018,969, the weight ratio of solvent to sulfur or alkali-sulfur compound can be between 1:10 and 1:1. The amount of solvent is preferably chosen so that up to 75% by weight of the compounds are present in the undissolved state, so as not to lower the energy density and the reaction rate unnecessarily by excessive amounts of solvent. Otherwise, it is recommended that several solvents which are mixed with each other be placed into the cathode chamber to dissolve the different alkali polysulfides and the sulfur itself.

The present invention relates to an improvement and further embodiment of the electrochemical storage cell or battery described in U.S. Pat. No. 4,018,969, and more particularly is directed to making available a solvent component in such cell especially suitable for dissolving polysulfides. It is assumed that, preferably, at least two different solvents are used.

Essentially the following four criteria have been determined for the selection of suitable solvents:

The solvent should have good solubility for the different alkali polysulfides and at the same time, good compatibility with the less polar-structured solvents suitable for dissolving sulfur as for example disclosed in related application referred to in Cross Reference to Related Application. The solvent with its content of dissolved alkali polysulfide must exhibit satisfactory conductivity. It should have a low dissociation voltage. Especially good chemical long-term stability of the solvent are furthermore important.

For extended operating times, it has now been found that the last-mentioned point is more critical than expected in some solvents which appeared to be basically suitable. Thus, multivalent alcohols or thioalcohols were entirely satisfactory for shorter and medium operating times, but not for the planned operating times of up to 5 years, as there, the decomposition would proceed on too large a scale.

The selection of suitable solvents good chemical stability for a long term is particularly difficult, especially for dissolving the polysulfides, because the presence of polar groups in the solvent molecule is necessary. The reason for this is that the polar groups make the solvent molecules susceptible to the sulfur, where the attack of the sulfur sets in at the C—H bonds, which bonds are present in the organic solvents.

SUMMARY OF THE INVENTION

An object of the present invention is to provide a chemical storage cell or battery of the alkali metal and sulfur type with organic solvent media which meet the above-mentioned criteria for solvents, especially the criterion of chemical stability for long operating periods.

With the foregoing and other objects in view, there is provided in accordance with the invention an electrochemical storage cell or battery operable in the range from about 100° C. to 200° C., of the alkali metal and sulfur type with at least one anode chamber and at least one cathode chamber separated from each other by an alkali ion-conducting solid electrolyte, and at least one organic aprotic solvent having a boiling point above the operating temperature of the cell, contained in the cathode chamber for dissolving, at least partially, alkali compounds contained in the cathode chamber, the improvement comprising adding another organic solvent component to the cathode chamber, which solvent component is miscible with said organic aprotic solvent and also has a boiling point above the operating temperature of the cell, and in addition the solvent component is a compound of at least one radical selected from the group consisting of N—CF₃, N—SO₂F, NCOCH₃, N—SO₂—N, N—CO—N, N—CS—N and N—CF₂—N, wherein the free nitrogen valences are saturated by one or two radicals selected from the group consisting of CH₃, C(CH₃)₃, COCH₃, CF₃, SO₂—CF₃, SO₂F and phenyl.

Compounds which are particularly advantageous as solvents are:

A compound which contains at least two radicals selected from the group consisting of N—CF₃, N—SO₂CF₃, N—SO₂F, N—COCH₃, N—SO₂—N, N—CO—N, N—CS—N and N—CF₂—N, where these radicals are linked with each other via maximally two methylene groups A compound having the formula:

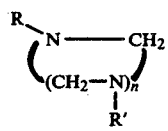

where n is an integer having a value of 2 to 5 inclusive, and R and R' each represent a radical selected from the group consisting of COCH₃, CF₃, SO₂F and SO₂—SF₃

A compound having the formula:

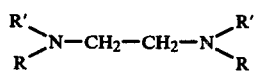

where R and R' each represent a radical selected from the group consisting of CH₃ and COCH₃

A compound having the formula:

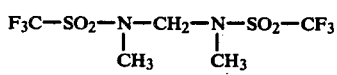

A compound having the formula:

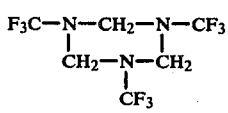

A compound having the formula:

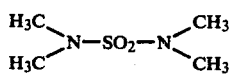

A compound having the formula:

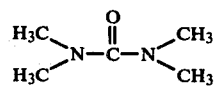

A compound having the formula:

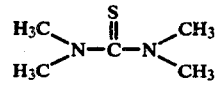

A compound having the formula:

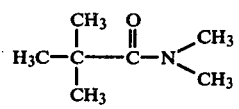

A compound having the formula:

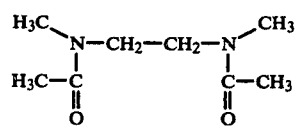

A compound having the formula:

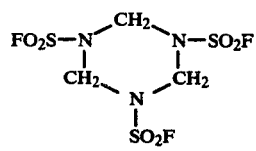

A compound having the formula:

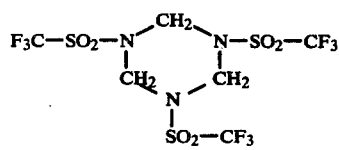

A compound having the formula:

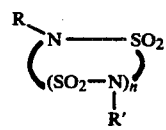

where n is an integer having a value of 2 to 5 inclusive, and R and R' each represent a radical selected from the group consisting of COCH₃, CF₃, SO₂F and SO₂—CF₃.

In addition to combining the solvents mentioned in order to optimally utilize their ability to dissolve the different components, it also turned out to be advantageous in many cases to also use unsubstituted toluol or, even better, o-tolunitrile as a component for dissolving elemental sulfur.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
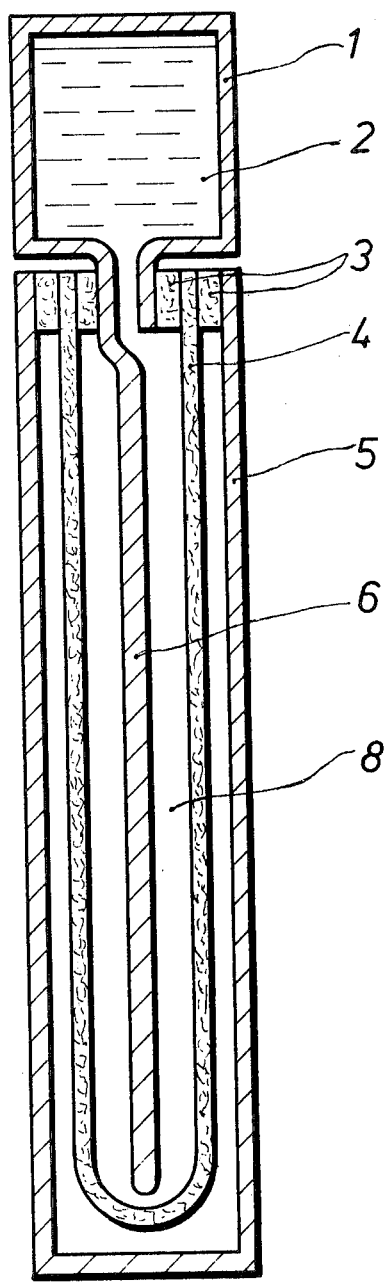
FIG. 1 is a side elevation of a tubular cell containing sodium in an anode chamber and sulfur and polysulfides together with solvent in a cathode chamber in accordance with the invention.

Normally, it is not necessary to employ an amount of solvents in the cathode chamber to effect solution of the entire content of polysulfides or sulfur in the cathode chamber, since the dissolution rate with the solvents of interest is as a rule higher than the speed of the electrochemical transport reaction. This fact is favorable inasmuch as the energy density would drop to an undesirable degree if the solvent content is too high. However, enough solvent must be present so that the solvent always remains in contact with the solid electrolyte over an area as large as possible, which area may optionally be capillary-active, in order to ensure the necessary mass transport. Measurements have shown that the undissolved content of polysulfides can perfectly well be 75 weight % and possibly even more. A typical operating range is characterized by a weight ratio of solvent to sulfur or alkali-sulfur compounds, respectively, of 1:10 to 1:1. A ratio in which the sulfur or alkali-sulfur compounds are in a greater proportion than 1:10 will not generally be chosen because the energy density already drops distinctly at this value. However, it is conceivable to go below the ratio 1:1 in the case of certain particularly advantageous solvents.

It was pointed out that with the basically highly desirable lowering of the operating temperature under U.S. Pat. No. 4,018,969, a certain disadvantage must nevertheless be tolerated, namely, the slowing-up of the electrochemical reaction and an increase of the internal resistance of the solid electrolyte. In order to compensate for this disadvantage, it is advantageous to construct the solid electrolyte or the cells, so that the boundary or reaction surface area is increased considerably over known designs, preferably 3 to 10-times. In one specific embodiment of the invention this can be accomplished by making the solid electrolyte as a cylindrical or square block of beta-$Al_2O_3$ with numerous parallel canals, the canals being filled alternatingly with alkali metal or sulfur or polysulfide.

A better utilization of the volume in the above-mentioned sense can be achieved if the solid-electrolyte body is not made cylindrical but with a square or hexagonal cross section. In this manner, cells of rather high power density with a maximum capillary reaction surface can be fabricated.

As a further measure in connection with the above-mentioned slowing-up of the reactions, the addition of tetracyanoethylene for improving the charging capacity and rate is advisable. At operating temperatures up to 150° C., tetracyanoquinomethane can also be used to special advantage. This measure is particularly suitable for low-temperature cells of the present type.

The additive according to the invention is not limited to sulfur and sulfur compounds. Other chalcogens, such as selenium, can also be added.

The invention will be explained in the following in greater detail with reference to embodiment examples, from which further features and advantages of the invention may be seen.

Referring to FIG. 1, the tubular cell contains a steel wall 1, which shields the Na-reservoir 2 against the atmosphere. By means of $\alpha$-$Al_2O_3$ rings 3, which are connected to the adjoining parts by means of glass solder, the transition, on the one hand, between the $\beta$-$Al_2O_3$ ceramic 4 and the steel wall 1 and, on the other hand, that between the $\beta$-$Al_2O_3$ ceramic 4 and the steel housing 5 can be effected. A steel current collector 6 is immersed in the liquid sodium 8, which is present in excess. The wall thickness of the ceramic tube 4 of $\beta$-$Al_2O_3$ is 1.5 mm. The gap width between the latter and the steel housing 5 is 4.5 mm. In cell tests, about 1 g graphite felt was contained between the $\beta$-$Al_2O_3$ ceramic and the steel housing 5. In the cathode chamber were contained the cathode substance and solvent and filled a volume of about 13 ml. The wetted surface of the $\beta$-$Al_2O_3$ was about 10 cm².

Several solvents of similar chemical composition were boiled with sulfur in a reflux arrangement. The amount of $H_2S$ produced was determined through formation of PbS in a Pb($CH_3COO$)$_2$ solution. It was found that solvents with the following functional groups are stable:

The free electron pair at the nitrogen apparently prevents the reactivity of adjacent C—H bonds. Thus, it is no longer possible for the sulfur to abstract hydrogen from C—H bonds stabilized in this manner forming either as a Lewis base or a radical. On the other hand, C—H bonds in the immediate vicinity to an oxygen are stabilized only insufficiently or not at all, so that substances with ether groupings develop $H_2S$ in the thermal treatment with sulfur.

Figure 2:
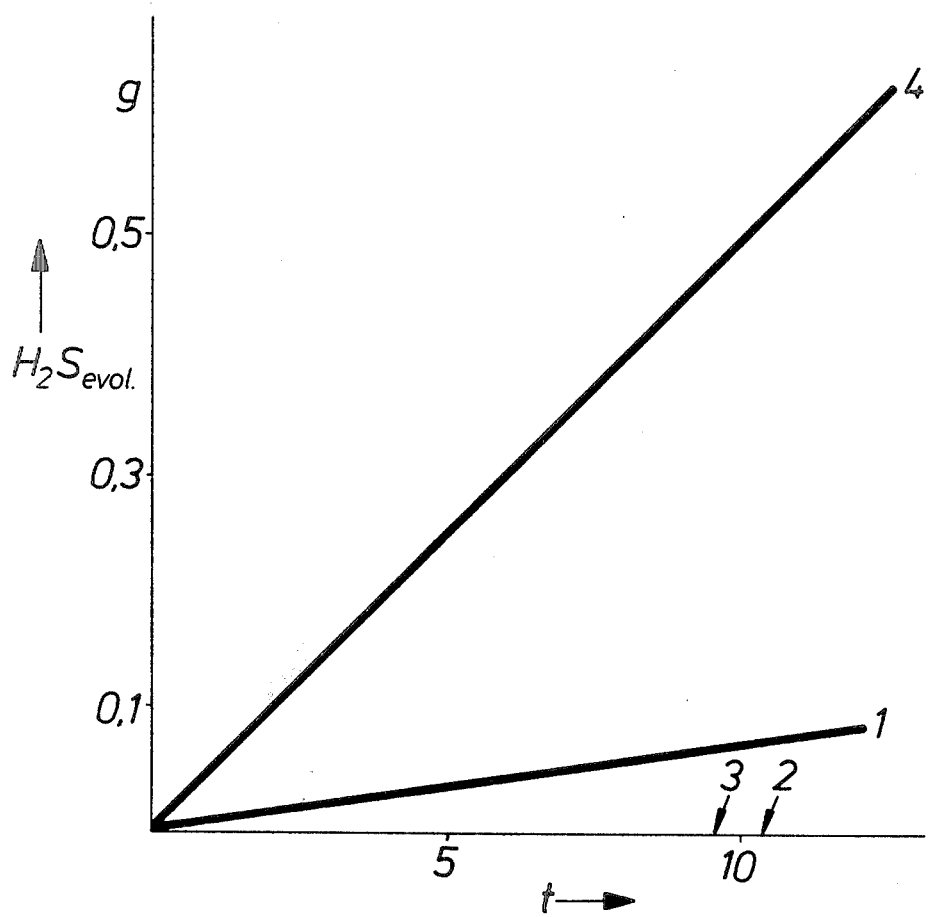
FIG. 2 is a graph showing the stability of various solvents in the presence of sulfur.

This is shown in FIG. 2 50 g of the solvent were heated with 5 g sulfur each for 3 months at 150° C. in an $N_2$-atmosphere. The amount of $H_2S$ evolved was measured at intervals of 3 days each. The measurement results of certain solvents are plotted versus time. Curve 1 is obtained with diethylene-glycol-dimethyl ether. For the reasons mentioned above, this substance should not be stable, and this is confirmed. FIG. 2 shows the behavior of tetramethyl urea. According to the theoretical considerations above, the C—H bonds adjacent to the nitrogen should be stable via-a-vis sulfur. This is the case. Curve 3 shows the behavior of NN'-diacetyl-NN'-diethylethane diamine. In this molecule, all C—H bonds are immediately adjacent to the nitrogen. Actually, no $H_2S$ development takes place with this molecule, contrary to the course of Curve 1, where the solvent contains $CH_3$-groups which are immediately adjacent to the oxygen. In Curve 4 of FIG. 2, the result for tetrahydrothiophene-SS-dioxide, also called sulfolane, is plotted. It is seen that with this solvent, the immediate vicinity of the C—H bond to the sulfur or the $SO_2$-group lowers the stability of the C—H bond and increases its C—H acidity.

Figure 3:
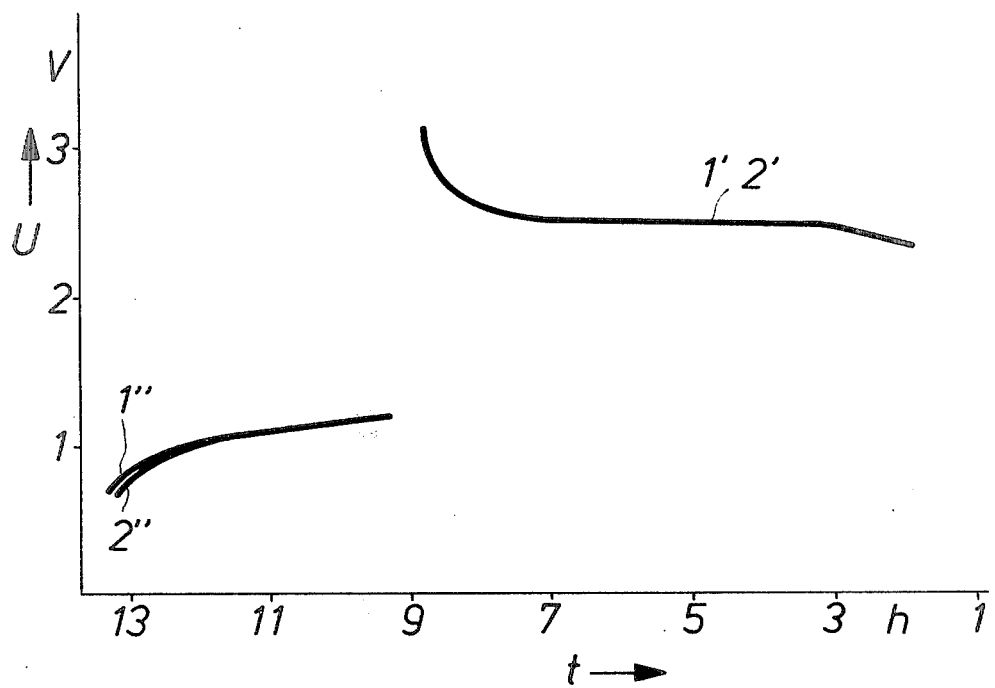
FIG. 3 is a graph showing the voltage-time characteristics obtained with a tubular cell of FIG. 1 using various solvents.

The required stability of the solvents was tested in cell tests. The result can be seen in FIG. 3. There, the voltage-time characteristics of the 12th and the 90th charging cycle are compared with each other. The discharge curves are designated with 1″ (12th cycle) and 2″ (90th cycle) and the charging curves with 1′ (12th cycle) and 2′ (90th cycle). 0.76 g sulfur, 0.020 g tetracyanoethylene and 12 g NN′ diacetyl-NN′-dimethylethane diamine as solvent were placed in the sulfur chamber of the cell. Because of the small added amount of sulfur, the solvent was not saturated with Na₂Sx. The result was that, first, the optimum conductivities were not obtained, and secondly, the cycling had to be carried out with small charging and discharging currents. The equality of the voltage-time curves of the 12th and the 90th cycle shows, however, that the solvent is capable under cell conditions to ensure the reversibility of the reaction

Basically, the same relations were ascertained also for the other solvent additives according to the invention.

Figure 4:
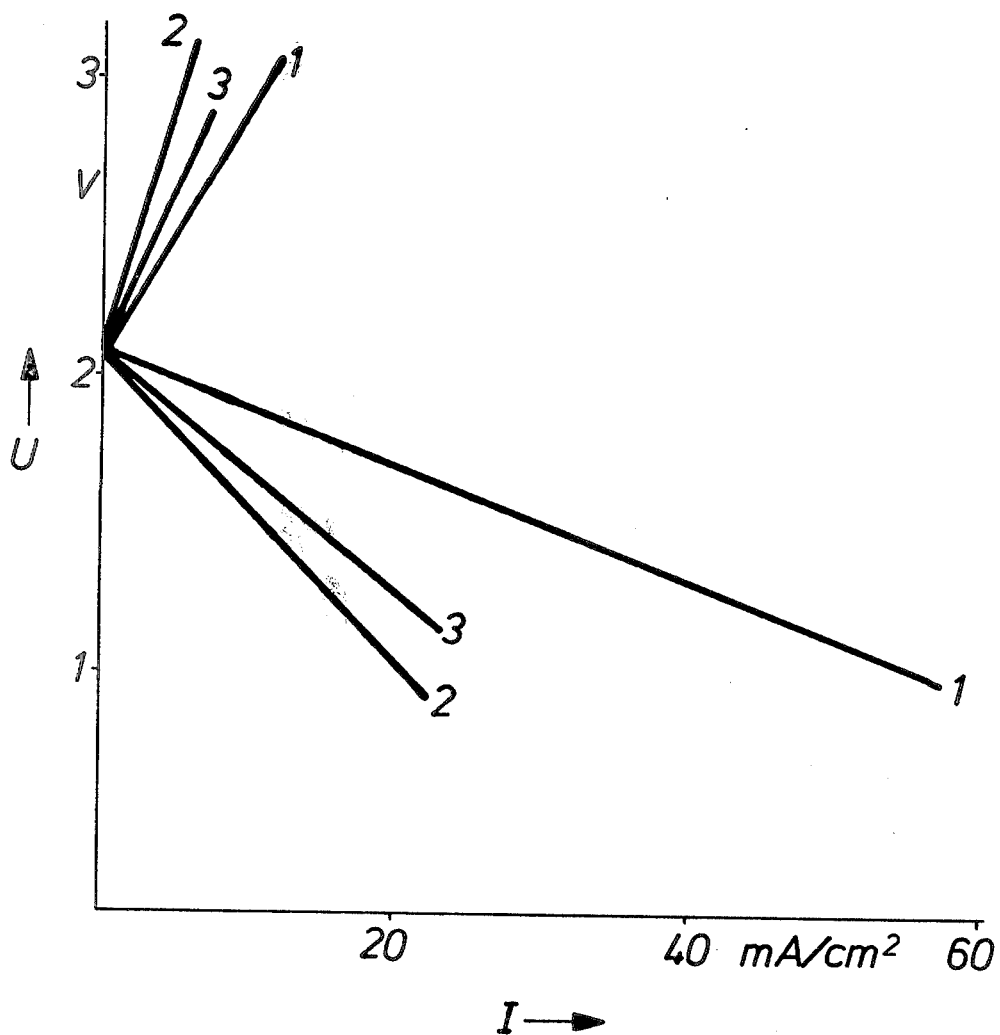
FIG. 4 is a graph showing the U/I characteristics when using various solvents.

In order to demonstrate the kinetic suitability of the solutions according to the invention, several U/I characteristics are plotted in FIG. 4. In Curve 1, tetramethyl urea, in Curve 2, NN′ diacetyl-NN′ dimethylethane diamine and in Curve 3, a mixture of NN′ diacetyl-NN′ dimethylethane diamine with tetramethyl sulfonamide were used as the solvent. It is seen that at the power maximum (=discharge voltage which corresponds to one-half the no-load voltage, or to 2 V in the present example), current densities of 50 mA/cm² can be obtained at 150° C. during discharge, so that a battery with the solvent additive according to the invention meets the data required in practice.

There are claimed:

1. An electrochemical storage cell or battery operable in the range from about 100° C. to 200° C., comprising an alkali metal and sulfur with at least one anode chamber and at least one cathode chamber separated from each other by an alkali ion-conducting solid electrolyte, and at least one organic aprotic solvent having a boiling point above the operating temperature of the cell, contained in the cathode chamber for dissolving, at least partially, alkali compounds contained in the cathode chamber, the improvement comprising adding another organic solvent component to the cathode chamber, which solvent component is miscible with said organic aprotic solvent and also has a boiling point above the operating temperature of the cell, and in addition the solvent component is composed of at least one compound having at least one radical selected from the group consisting of N—CF₃, N—SO₂F, N—COCH₃, N—SO₂N, N—CO—N, N—CS—N, N—CF₂N, wherein the free nitrogen valences are saturated by one or two radicals selected from the group consisting of CH₃, C(CH₃)₃, COCH₃, CF₃, SO₂—CF₃, SO₂F, and phenyl.

2. Storage cell or battery according to claim 1, wherein a compound is added as a solvent component, which contains at least two radicals selected from the group consisting of N—CF₃, N—SO₂—CF₃, N—SO₂F, N—COCH₃, N—SO₂—N, N—CO—N, N—CS—N, and N—CF₂—N, where these radicals are linked with each other via maximally two methylene groups.

3. Storage cell or battery according to claim 1, wherein the following compound is added as a solvent;

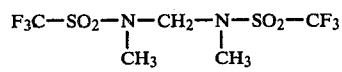

4. Storage cell or battery according to claim 1, wherein the following compound is added as a solvent;

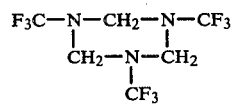

5. Storage cell or battery according to claim 1, wherein the following compound is added as a solvent:

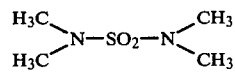

6. Storage cell or battery according to claim 1, wherein the following compound is added as a solvent:

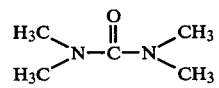

7. Storage cell or battery according to claim 1, wherein the following compound is added as a solvent:

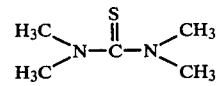

8. Storage cell or battery according to claim 1, wherein the following compound is added as a solvent:

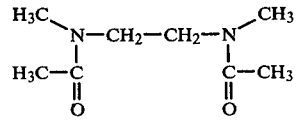

9. Storage cell or battery according to claim 1, wherein the following compound is added as a solvent:

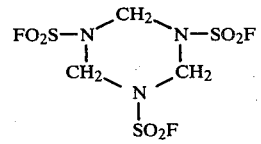

10. Storage cell or battery according to claim 1, wherein the following compound is added as a solvent:

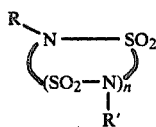

where n is an integer having a value of 2 to 5 inclusive, and R and R' each represent a radical selected from the group consisting of $COCH_3$, $CF_3$, $SO_2F$ and $SO_2$—$CF_3$.

11. An electrochemical storage cell or battery operable in the range from about 100° C. to 200° C., comprising an alkali metal and sulfur with at least one anode chamber and at least one cathode chamber separated from each ther by an alkali ion-conducting solid electrolyte, and at least one organic aprotic solvent having a boiling point above the operating temperature of the cell, contained in the cathode chamber for dissolving, at least partially, alkali compounds contained in the cathode chamber, the improvement comprising adding another organic solvent component to the cathode chamber, which solvent component is miscible with said organic aprotic solvent and also has a boiling point above the operating temperature of the cell, and in addition the solvent component is composed of at least one compound having the formula

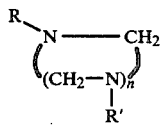

where n is an integer having a value of 2 to 5 inclusive, and R and R' each represent a radical selected from the group consisting of $COCH_3$, $CF_3$, $SO_2F$ and $SO_2$—$SF_3$.

12. An electrochemical storage cell or battery operable in the range from about 100° C. to 200° C., comprising an alkali metal and sulfur with at least one anode chamber and at least one cathode chamber separated from each other by an alkali ion-conducting solid electrolyte, and at least one organic aprotic solvent having a boiling point above the operating temperature of the cell, contained in the cathode chamber for dissolving, at least partially, alkali compounds contained in the cathode chamber, the improvement comprising adding another organic solvent component to the cathode chamber, which solvent component is miscible with said organic aprotic solvent and also has a boiling point above the operating temperature of the cell, and in addition the solent component is composed of at least one compound having the formula

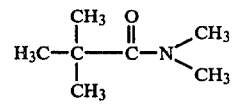

where R and R' each represent a radical selected from the group consisting of $CH_3$ and $COCH_3$.

13. An electrochemical storage cell or battery operable in the range from about 100° C. to 200° C. comprising an alkali metal and sulfur with at least one anode chamber and at least one cathode chamber separated from each other by an alkali ion-conducting solid electrolyte, and at least one organic aprotic solvent having a boiling point above the operating temperature of the cell, contained in the cathode chamber for dissolving, at least partiallly, alkali compounds contained in the cathode chamber, the improvement comprising adding another organic solvent component to the cathode chamber, which solvent component is miscible with said organic aprotic solvent and also has a boiling pont above the operating temperature of the cell, and in addition the solvent component is composed of at least one compound having the formula $$H_3C-\underset{\underset{CH_3}{|}}{\overset{\overset{CH_3}{|}}{C}}-\overset{\overset{O}{\|}}{C}-N\overset{CH_3}{\underset{CH_3}{\diagdown}}$$

14. An electrochemical storage cell or battery operable in the range from about 100° C. to 200° C., comprising an alkali metal and sulfur with at least one anode chamber and at least one cathode chamber separated from each ther by an alkali ion-conducting solid electrolyte, and at least one organic aprotic solvent having a boiling point above the operating temperature of the cell, contained in the cathode chamber for dissolving, at least partially, alkali compounds contained in the cathode chamber, the improvement comprising adding another organic solvent component to the cathode chamber, which solvent component is miscible with said organic aprotic solvent and also has a boiling point above the operating temperature of the cell, and in addition the solvent component is composed of at least one compound having the formula

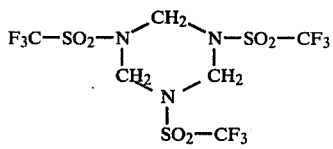

* * * * *